Patented Nov. 8, 1932

1,887,228

UNITED STATES PATENT OFFICE

EDGAR C. BRITTON AND HAROLD R. SLAGH, OF MIDLAND, MICHIGAN, ASSIGNORS TO THE DOW CHEMICAL COMPANY, OF MIDLAND, MICHIGAN, A CORPORATION OF MICHIGAN

PREPARATION OF MONO-ALKYL AROMATIC AMINES

No Drawing.  Application filed November 11, 1931.  Serial No. 574,354.

The present invention concerns a method for preparing N-mono-alkyl- and N-mono-aralkyl-arylamines in a form substantially free of contamination by isomeric by-products through reacting an arylamine salt, having the general formula aryl-NH.M, wherein M represents a metal selected from the group consisting of sodium, potassium, calcium, magnesium, and aluminum, with an alkyl or aralkyl halide.

In our co-pending application, Serial Number 333,514, filed January 18, 1929, we have disclosed the fact that when an arylamine salt, having the general formula mentioned above, is reacted with an alkyl, aryl or aralkyl halide at a temperature between 100° and 250° C., two isomeric compounds having the general formulae aryl-NH.R and R.aryl-NH$_2$, respectively, in which formulae R represents an alkyl, aryl or aralkyl residue, are formed conjointly.

We have now found that an arylamine salt having the general formula aryl-NH.M, wherein M represents a metal selected from the group consisting of calcium, magnesium, aluminum and the alkali metals, may be reacted with an alkyl or aralkyl halide at a temperature below 100° C. to form, substantially, only a secondary arylamine having the general formula aryl-NH.R wherein R represents an alkyl or aralkyl residue; the isomeric compound, of general formula R.aryl-NH$_2$, being formed in inappreciable quantity, if at all. The present invention, then, consists in an improved method for preparing a secondary arylamine having the general formula, aryl.NHR, wherein R represents a residue selected from the group consisting of alkyl and aralkyl residues, such method being hereinafter fully described and particularly pointed out in the claims.

The following examples illustrate several of the various ways in which the principle of the invention may be employed. It is to be understood, however, that said examples are purely illustrative and are not to be construed as a limitation on the invention.

Example 1

In a small iron autoclave, provided with a mechanical stirrer, were placed 1815 grams (19.5 moles) of dry aniline, 92 grams (4.0 moles) of metallic sodium, 1 gram of cuprous oxide, and 1 gram of copper bronze. The mixture was stirred and heated at 160° C. during a three hour period, the pressure within the reactor, being maintained at 50 pounds gauge by releasing hydrogen from time to time during the course of the operation. The autoclave was then cooled to approximately 30° C., substantially all of the hydrogen liberated therefrom, and then 256 grams (3.97 moles) of ethyl chloride admitted thereto during a 12 minute period. The reaction mixture within the autoclave was then heated to, and maintained at, approximately 75° C. during a one hour period, said reaction mixture being stirred during the course of such treatment. The autoclave was next cooled to room temperature and the reaction mixture removed therefrom. Sodium chloride was extracted from the reaction mass with water and the residual organic mixture was dried, and fractionally distilled so as to separate the various components thereof. There was obtained, thereby, 422 grams (3.49 moles) of substantially pure N-mono-ethyl-aniline. No aniline, having an ethyl substituent in its nucleus, was separated.

Example 2

Sodium anilide was prepared through heating, in an autoclave, at a temperature between 175° and 180° C. and during a two hour period, 1815 grams (19.5 moles) of aniline with 92 grams (4.0 moles) of metallic sodium. The autoclave was cooled to room temperature, hydrogen liberated therefrom, then 440 grams (4.0 moles) of ethyl bromide slowly admitted thereto during a one hour period, the reaction mixture being stirred and maintained at 30° to 42° C. during the addition. The stirred reaction mixture was then heated to, and maintained at, approximately 68° C. during a one hour period. The reaction mixture was removed from the autoclave and separated into its various components through procedure similar to that described in Example 1. There was obtained 166 grams (1.4 moles) of substantially pure N-mono-ethyl aniline. No ring ethylated aniline was obtained.

Example 3

Through procedure similar to that described in Example 1, 350 grams (3.8 moles) of aniline was reacted with 35 grams (1.5 moles) of metallic sodium, in the presence of a mixture of cuprous oxide and copper bronze as a catalyst, to form sodium anilide. The reaction mixture was removed from the autoclave and excess aniline distilled from said mixture under reduced pressure. The sodium anilide was dissolved in 250 grams of diphenyl ether, and the solution returned to the autoclave. The reaction mixture, which was maintained at approximately 30° C., was stirred, and 77 grams (1.5 moles) of methyl chloride added thereto during a three hour period. The reaction mixture was then removed from the autoclave, extracted with water, dried, and fractionally distilled under reduced pressure. There was obtained 110 grams (1.0 mole) of substantially pure N-mono-methyl aniline. No ring methylated aniline was obtained.

Example 4

Through procedure similar to that described in Example 1, 250 grams (2.7 moles) of aniline was reacted with 15 grams (0.65 moles) of sodium in the presence of cuprous oxide as a catalyst. To the stirred reaction mixture, maintained within an autoclave at the temperature 45° to 47° C., was added 60 grams (0.76 moles) of isopropyl chloride during a 0.5 hour period. After the addition of isopropyl chloride was completed, the mixture was stirred and maintained at 45° to 47° C. during an additional 2 hour period. The reaction mass was then removed from the autoclave and separated into its several components through procedure similar to that described in Example 1. There was obtained 36 grams (0.266 moles) of substantially pure N-mono-isopropyl aniline. No aniline bearing nuclear substituents was obtained.

Example 5

In a liter 3-necked flask provided with a mechanical stirrer, a dropping funnel, and a reflux condenser fitted with a drying tube, were placed 250 grams (2.7 moles) of aniline, 15 grams (0.65 moles) of sodium, and approximately 1 gram of cuprous oxide. The mixture was stirred and heated to a temperature between 150° and 160° C. during a one hour period, at the end of which time all of the sodium had reacted to form sodium anilide. The reaction mixture was then cooled to between 70° and 75° C., and, while maintaining the stirred reaction mixture within said temperature range, 65 grams (0.70 moles) of normal butyl chloride was added during a 45 minute period. After the addition of normal butyl chloride was completed the reaction mixture was stirred and maintained at a temperature between 70° and 75° C. during an additional two hour period. The various reaction components were then separated through procedure similar to that described in Example 1. There was obtained 83 grams (0.56 moles) of substantially pure N-mono-butyl aniline. No ring substituted aniline was obtained.

Example 6

Through procedure similar to that described in Example 5, 23 grams (1.0 moles) of sodium was reacted with 325 grams (3.5 moles) of aniline during a 3.5 hour period. The reaction mixture was then cooled to 50° to 60° C. and, while stirring and maintaining the mixture within said temperature range, 128 grams (1.0 moles) of benzyl chloride was added thereto during a 1.5 hour period. The reaction mixture was then stirred and maintained at approximately 70° C. for one hour, after which the various components thereof were separated through procedure similar to that described in Example 1. There was obtained 166 grams (0.91 moles) of substantially pure N-mono-benzyl aniline, the yield thereof being approximately 96 per cent of theoretical, based on the quantity of sodium used. No amino-benzyl-benzene was obtained.

Reactants other than those specifically mentioned in the examples may be employed in practicing the principle of our invention. A naphthylamine salt having the general formula

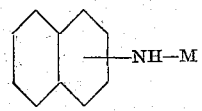

wherein M represents a metal selected from the group consisting of calcium, magnesium, aluminum and the alkali metals, may, for instance, be reacted with an alkyl halide at a temperature below 100° C. to form an N-mono-alkyl-naphthylamine in a form substantially free of contamination by isomeric by-products. Other arylamines may be employed successfully for similar purpose and in similar manner. The present invention, in brief, comprises reacting an arylamine salt having the general formula,

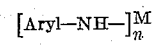

wherein M represents a metal selected from the group consisting of calcium, magnesium, aluminum and the alkali metals, and $n$ is the valence exhibited by M, with an alkyl or aralkyl halide at a temperature below 100° C., to form a secondary arylamine having the general formula, aryl-NH.R, wherein R represents a residue selected from the group consisting of alkyl and aralkyl residues.

The lower reaction temperature limit which may be employed in practicing the principle of our invention is dependent, largely, upon the reactivities of the particular reactants employed. We find, however, that a reaction temperature between 30° and 100° C. is suitable in most instances, although with some reactants, the reaction involved may be carried out at a lower temperature.

It might be mentioned that while it is advantageous to employ a copper-containing catalyst in forming a metal salt of an arylamine, as specified in the examples, the presence of such a catalyst is not essential to the formation of a secondary arylamine from said metal salt of an arylamine, and, indeed, the arylamine salt, itself, may be prepared in the absence of a catalyst.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:—

1. A method for preparing a secondary arylamine having the general formula, aryl-NH.R, wherein R represents a residue selected from the group consisting of alkyl and aralkyl residues, which comprises reacting, at a temperature below 100° C., an arylamine salt, having the general formula

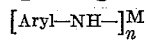

wherein M represents a metal selected from the group consisting of calcium, magnesium, aluminum, and the alkali metals, and $n$ represents the valence exhibited by M, with a halo-hydrocarbon having the general formula, R—X, wherein X represents a halogen group which is attached to an alkyl residue and R represents a residue selected from the group consisting of alkyl and aralkyl residues.

2. A method for preparing a secondary arylamine having the general formula, aryl-NH.R, wherein R represents a residue selected from the group consisting of alkyl and aralkyl residues, which comprises reacting, at a temperature below 100° C., an arylamine salt having the general formula, aryl-NH.R, wherein M represents an alkali metal, with a halo-hydrocarbon having the general formula, R—X, wherein X represents a halogen group which is attached to an alkyl residue and R represents a residue selected from the group consisting of alkyl and aralkyl residues.

3. A method for preparing a secondary arylamine having the general formula, aryl-NH.R, wherein R represents a residue selected from the group consisting of alkyl and aralkyl residues, which comprises reacting, at a temperature between 30° and 100° C. an arylamine salt having the general formula,

wherein M represents a metal selected from the group consisting of calcium, magnesium, aluminum, and the alkali metals and $n$ represents the valence exhibited by M, with a halo-hydrocarbon having the general formula, R—X, wherein X represents a halogen group which is attached to an alkyl residue and R represents a residue selected from the group consisting of alkyl and aralkyl residues.

4. A method for preparing a secondary arylamine having the general formula, aryl-NH.R, wherein R represents a residue selected from the group consisting of alkyl and aralkyl residues, which comprises reacting, at a temperature between 30° and 100° C., an arylamine salt having the general formula, aryl-NH.M, wherein M represents an alkali metal, with a halo-hydrocarbon having the general formula, R—X, wherein X represents a halogen group which is attached to an alkyl residue and R represents a residue selected from the group consisting of alkyl and aralkyl residues.

5. A method for preparing a secondary arylamine having the general formula, aryl-NH.R, wherein R represents a residue selected from the group consisting of alkyl and aralkyl residues, which comprises reacting, at a temperature below 100° C. an arylamine salt having the general formula

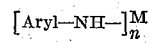

wherein M represents a metal selected from the group consisting of calcium, magnesium, aluminum, and the alkali metals, and $n$ represents the valence exhibited by M, with approximately its chemical equivalent of a halo-hydrocarbon having the general formula, R—X, wherein X represents a halogen group which is attached to an alkyl residue and R represents a residue selected from the group consisting of alkyl and aralkyl residues, and separating the secondary arylamine from the reaction mixture.

6. A method for preparing a secondary arylamine having the general formula, aryl-NH.R, wherein R represents a residue selected from the group consisting of alkyl and aralkyl residues, which comprises reacting, at a temperature between 30° and 100° C., an arylamine salt having the general formula, aryl-NH.M, wherein M represents an alkali metal, with approximately its chemical equivalent of a halo-hydrocarbon having the general formula, R—X, wherein X represents a halogen group which is attached to an alkyl residue and R represents a residue selected from the group consisting of alkyl and aryl residues, and distilling the secondary arylamine, so produced, from the reaction mixture.

7. A method for preparing an N-mono-alkyl-arylamine which comprises reacting at a temperature below 100° C., an arylamine salt having the general formula, aryl-NH.M, wherein M represents a metal selected from the group consisting of calcium, magnesium, aluminum and the alkali metals, with an alkyl halide, and separating the N-mono-alkyl-arylamine, so produced, from the reaction mixture.

8. A method for preparing N-mono-alkyl-arylamine which comprises reacting, at a temperature between 30° and 100° C., an arylamine salt having the general formula, aryl-NH.M, wherein M represents an alkali metal, with an alkyl halide, and distilling the N-mono-alkyl-arylamine, so produced, from the reaction mixture.

9. A method for preparing N-mono-methyl-aniline which comprises reacting, at a temperature below 100° C., a metal-anilide having the general formula, $C_6H_5$-NH.M, wherein M represents a metal selected from the group consisting of calcium, magnesium, aluminum, and the alkali metals, with a methyl halide.

10. A method for preparing N-mono-methyl-aniline which comprises reacting, at a temperature between 30° and 100° C., a metal anilide having the general formula, $C_6H_5$-NH.M, wherein M represents an alkali metal, with a methyl halide.

11. A method of preparing N-mono-methyl-aniline which comprises reacting, at a temperature between 30° and 100° C., mono-sodium anilide with approximately its chemical equivalent of methyl chloride, and separating the N-mono-methyl-aniline from the reaction mixture.

12. A method for preparing N-mono-ethylaniline which comprises reacting, at a temperature below 100° C., a metal anilide having the general formula, $C_6H_5$-NH.M, wherein M represents a metal selected from the group consisting of calcium, magnesium, aluminum, and the alkali metals, with an ethyl halide.

13. A method for preparing N-mono-ethyl-aniline which comprises reacting, at a temperature between 30° and 100° C., a metal anilide having the general formula, $C_6H_5$-NH.M, wherein M represents an alkali metal, with an ethyl halide.

14. A method for preparing N-mono-ethyl-aniline which comprises reacting, at a temperature between 30° and 100° C., mono-sodium-anilide with approximately its chemical equivalent of ethyl chloride, and separating the N-mono-ethyl-aniline from the reaction mixture.

15. A method for preparing N-mono-benzyl-aniline which comprises reacting, at a temperature below 100° C., a metal anilide having the general formula, $C_6H_5$-NH.M, wherein M represents a metal selected from the group consisting of calcium, magnesium, aluminum, and the alkali metals, with a benzyl halide.

16. A method for preparing N-mono-benzyl-aniline which comprises reacting, at a temperature between 30° and 100° C., a metal anilide having the general formula, $C_6H_5$-NH.M, wherein M represents an alkali metal, with a benzyl halide.

17. A method for preparing N-mono-benzyl-aniline which comprises reacting, at a temperature between 30° and 100° C., mono-sodium-anilide with approximately its chemical equivalent of benzyl chloride and separating the N-mono-benzyl-aniline from the reaction mixture.

Signed by us this 6 day of November, 1931.

EDGAR C. BRITTON.
HAROLD R. SLAGH.

CERTIFICATE OF CORRECTION.

Patent No. 1,887,228.　　　　　　　　　　　　　　　November 8, 1932.

EDGAR C. BRITTON ET AL.

It is hereby certified that error appears in the printed specification of the above numbered patent requiring correction as follows: Page 3, line 54, claim 2, for "aryl-NH.R" read "aryl-NH.M"; page 4, line 35, claim 11, for "of" read "for"; and that the said Letters Patent should be read with these corrections therein that the same may conform to the record of the case in the Patent Office.

Signed and sealed this 7th day of February, A. D. 1933.

(Seal)

M. J. Moore,
Acting Commissioner of Patents.